United States Patent
Bigi

(10) Patent No.: US 6,641,503 B1
(45) Date of Patent: Nov. 4, 2003

(54) AUTOMATIC SERVO-MECHANISM FOR SEQUENTIAL GEARBOX AND CLUTCH

(75) Inventor: Maurizio Bigi, Novi di Modena (IT)

(73) Assignee: Digitek S.p.A., Concordia S/Secchia (IT)

(*) Notice: Subject to any disclaimer, the term of this patent is extended or adjusted under 35 U.S.C. 154(b) by 0 days.

(21) Appl. No.: 09/958,815

(22) PCT Filed: Apr. 12, 2000

(86) PCT No.: PCT/IT00/00139

§ 371 (c)(1),
(2), (4) Date: Jan. 16, 2002

(87) PCT Pub. No.: WO00/61430

PCT Pub. Date: Oct. 19, 2000

(30) Foreign Application Priority Data

Apr. 14, 1999 (IT) ........................................ MO99A0071

(51) Int. Cl.[7] .............................................. B60K 41/02
(52) U.S. Cl. ......................................... 477/78; 192/3.58
(58) Field of Search ........................... 477/78; 192/3.57, 192/3.58

(56) References Cited

U.S. PATENT DOCUMENTS

| | | |
|---|---|---|
| 4,625,840 A | 12/1986 | Kojima et al. |
| 5,105,922 A | 4/1992 | Yant |
| 5,377,797 A | 1/1995 | Mustapha et al. |
| 5,662,195 A | 9/1997 | Rush |
| 5,992,590 A * | 11/1999 | Harries ...................... 192/3.58 |
| 6,015,031 A * | 1/2000 | Dorfschmid et al. ....... 192/3.58 |
| 6,102,829 A * | 8/2000 | Muddell et al. ............... 477/77 |

FOREIGN PATENT DOCUMENTS

| | | |
|---|---|---|
| EP | 0447383 A | 9/1991 |
| GB | 1461498 A | 1/1977 |

* cited by examiner

Primary Examiner—Dirk Wright
(74) Attorney, Agent, or Firm—Millen, White, Zelano & Branigan, P.C.

(57) ABSTRACT

The automatic servo-mechanism for sequential gearbox and clutch, which is fitted or which can be fitted to a motorised vehicle, comprises: a sequential gearbox, a hydraulic circuit (1) and an actuator (11) that controls the clutch, which actuator is actuated by a solenoid valve (10), characterized therein that it consists of: a selector (15) that regulates the analog electric signal that controls the solenoid valve (10), a microswitch (16) on the lever that actuates the clutch mechanically; the hydraulic circuit also contains at least one check valve (6) downstream of the pump (3); at least one pneumatic-hydraulic accumulator (7), connected downstream of the aforementioned check valve; the aforementioned proportional solenoid valve (10) that regulates the pressure in the controlled section (33) this is connected to the aforementioned actuator (11) according to the analog signal received.

13 Claims, 2 Drawing Sheets

AUTOMATIC SERVO-MECHANISM FOR SEQUENTIAL GEARBOX AND CLUTCH

The invention relates to an automatic servo-mechanism for a sequential gearbox and clutch, in other words a combination of hydraulic and electric devices that enable servo-assisted control of the clutch when a sequential gearbox is used, thus safeguarding all possible manual operations, but allowing the level of servo-assistance to be adjusted at will.

The prior art already includes actuator devices for sequential gearboxes that consist of hydraulic cylinders in which the pressure on the hydraulic cylinders changes the gear up or down, in sequence.

The prior art also includes mechanical actuators for the control of the clutch in motorcycles in which the mechanical control actuates a lever, which, by means of a sprocket-rack drive, shifts the clutch disk; the return to the original position is achieved by the clutch springs themselves. A manual hydraulic control is also used that consists of an actuator comprising a single-stroke hydraulic cylinder that acts on the clutch rod disk and which is controlled by a pump that is connected to the user's manual control lever.

The need for both manual and servo-assisted and possibly automatic dual operation is particularly keenly felt in racing and supertouring vehicles. In fact, in motorcycle applications dual operation of both the gear and the clutch is a very important safety factor.

With remote control of the gearbox, the control that actuates the sequential gearbox must at the same time actuate the clutch in order to operate correctly, therefore the familiar clutch actuator, in other words the aforementioned lever with sprocket and rod with rack, or the manual hydraulic control system with single-stroke cylinder, must be remote controlled.

These requirements are met by Italian patent application MO99A000025 by the inventor of this servo-mechanism, in which an actuator for the remote control of the clutch and an actuator for the gearbox are described; both actuators can be used separately or jointly in this servo-mechanism. In addition, the considerable power that is today used in motorcycle engines in particular requires the user to make a considerable effort to actuate the clutch, it is therefore extremely tiring to frequently actuate the clutch, as is necessary in racing or super tourism.

There is considerable scope for perfecting this prior art in terms of eliminating the disadvantages described above in order to enable the user to control at will the level of servo-assistance required, and to achieve complete automation.

The foregoing discussion shows that it is necessary to solve the technical problem of devising a servo-mechanism that adapts to the user's requirements, can be implemented at a later date, keeps manual operation completely straightforward, and is easy for even the user to fit onto the vehicle.

The invention solves the aforementioned technical problem by adopting: an automatic servo-mechanism for sequential gearbox and clutch, which is fitted or which can be fitted to a motorised vehicle, consisting of a sequential gearbox, a hydraulic circuit and an actuator that controls the clutch, which actuator is actuated by a solenoid valve, characterised therein that it consists of: a selector that regulates the analog electric signal that controls the solenoid valve; a microswitch on the lever that actuates the clutch mechanically; the hydraulic circuit also contains at least one check valve downstream of the pump; at least one pneumatic-hydraulic accumulator, connected downstream of the aforementioned check valve; the aforementioned proportional solenoid valve that regulates the pressure in the controlled section that is connected to the aforementioned actuator according to the analog signal received.

Adopting, in a preferred embodiment, the aforementioned selector, which regulates the analog electric signal, which signal can be set at any point on a scale from zero to the maximum value.

Adopting, in a second preferred embodiment, an electronic control unit, the input signals of which at least are connected to the aforementioned regulation selector, the control unit's output signals at least being connected to the aforementioned solenoid valve with outlet pressure that is proportionate to the analog electric control signal.

Adopting, in another preferred embodiment, a gear sensor, which is coupled mechanically to the selector drum of the sequential gearbox and is connected by means of its own output signal to the inputs of the aforementioned control unit.

Adopting, in another preferred embodiment, a clutch rod position sensor, which is coupled mechanically to the aforementioned clutch actuator and is connected by means of its own output signal to the inputs of the aforementioned control unit.

Adopting, in another preferred embodiment, a vehicle-speed sensor, coupled mechanically to the vehicle wheels and connected by means of its own output signal to the inputs of the aforementioned control unit.

Adopting, in another embodiment, a hydraulic-circuit pressure sensor, a sensor that monitors the position of the power control and a sensor that monitors the engine's revolutions per minute; each of the aforementioned sensors being connected by means of its own output signal to the inputs of the aforementioned control unit.

Adopting, in another preferred embodiment, the aforementioned control unit that is connected to control a device that temporarily cuts off the power generated by the engine, which device may be of any type that is suitable for the engine used.

Also adopting, in another embodiment, a gear change-intention sensor, which is connected between the gear lever and the frame, in order to monitor the gear actuation intention.

Also adopting, in another embodiment, the aforementioned gear change-intention sensor between the gear lever and the frame, which also monitors the direction of the gear change, for changing the gear up or down.

Finally adopting, in another preferred embodiment, an actuator for sequential gear changing, which actuates the gear lever without the user's intervening.

The following advantages are obtained by this invention: the electrohydraulic servo-mechanism enables the clutch to be controlled independently of its constitution, the user can in fact use the selector to set the intervention level and can choose completely manual, completely automatic or any intermediate position; in addition, the presence of the sensor on the sequential gearbox rod enables automatic operation to be combined with total servo-assistance if the user actuates the gearbox, or partial servo-assistance to be used if the user uses the clutch lever to override the automatic operation of the sensor on the gearbox rod.

In addition, the use of the electronic control unit, with its capacity to monitor a large number of parameters, enables further levels of automatic operation to be achieved, which enable clutch intervention to be adjusted during gear changing whereas otherwise the user has to control the clutch by reducing vehicle performance through sharp braking and swift gear changing.

Some embodiments of the invention have been illustrated, merely as examples, in the two attached plates of drawings, in which FIG. 1 is the electrohydraulic diagram of the servo-mechanism of the clutch, according to this invention, with monitoring of the sequential gearbox control;

Figure 1:
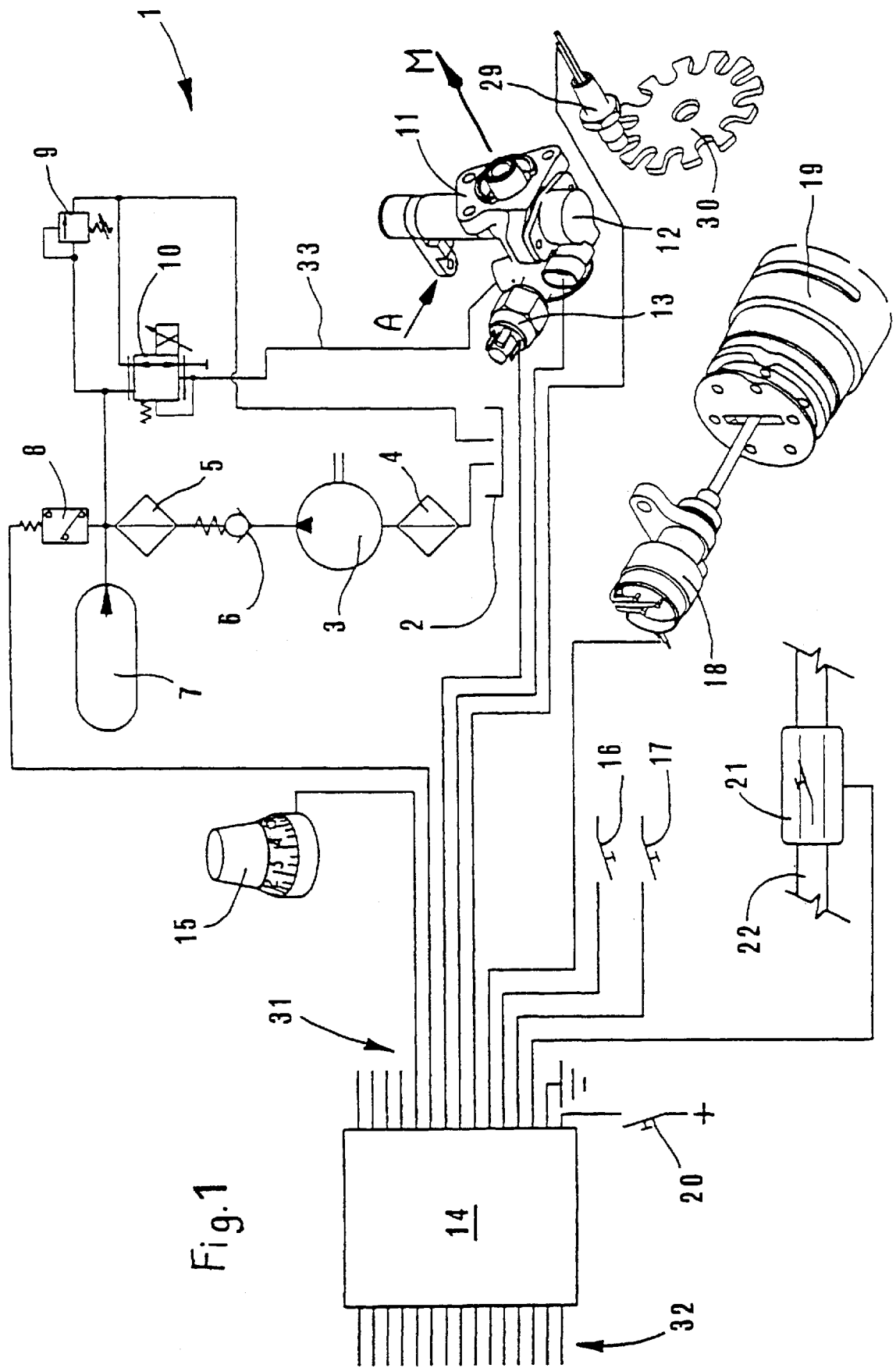

The following are shown: 1, FIG. 1 is the hydraulic circuit diagram, comprising the oil sump 2, with the advantage of the engine oil sump, the pump 3 and the inlet filter 4 and the outlet filter 5, a check valve 6 to prevent the oil flowing back towards the pump; 7 is a pneumatic-hydraulic accumulator, comprising the pressurised oil sump; 8 is a pressure switch or pressure transducer to monitor by means of an electric signal when operating pressure has been reached; 9 is a maximum pressure valve for discharging excess oil pumped during operation at a high rate of revolutions per minute; 10 is the proportional valve under pressure, which regulates control delivery pressure on the basis of the analog signal received; 11 is the hydraulic actuator that acts by means of movement M on the clutch rod; A is the force generated by the linkage of the clutch, to obtain said movement M; 12 is the sensor of the position of the clutch rod; 13 is the pressure sensor located directly on the actuator 11, which sensor monitors actuation pressure; 14 is the electronic control unit with the control logic for the different input signals; 15 is the selector of the level of servo-assistance; 16 and 17 are respectively the microswitches located to monitor the actuation of the clutch lever and of the brake lever; 18 is the sensor of the drum 19 position of the sequential gearbox; 20 is the control unit 14 start switch; 21 is the sensor for monitoring the actuation of rod 22 of the gearbox and possibly of its direction; 29 is the sensor of vehicle speed, in the case of motorcycles it is coupled to the wheel drive 30; 31 is the group of input signals to the control unit, which in addition to the connections shown has the advantage of comprising the other input signals of the number of engine revolutions per minute and of the position of the throttle; 32 are the output control signals from the control unit, shown here as a group of output conductors carrying: analog signal for solenoid valve 10, for proportional control of pressure; display of gear engaged; speed display; system fault light; start-up cut-off or other devices limiting power of engine and, finally, the command for the different alarms.

Figure 2:
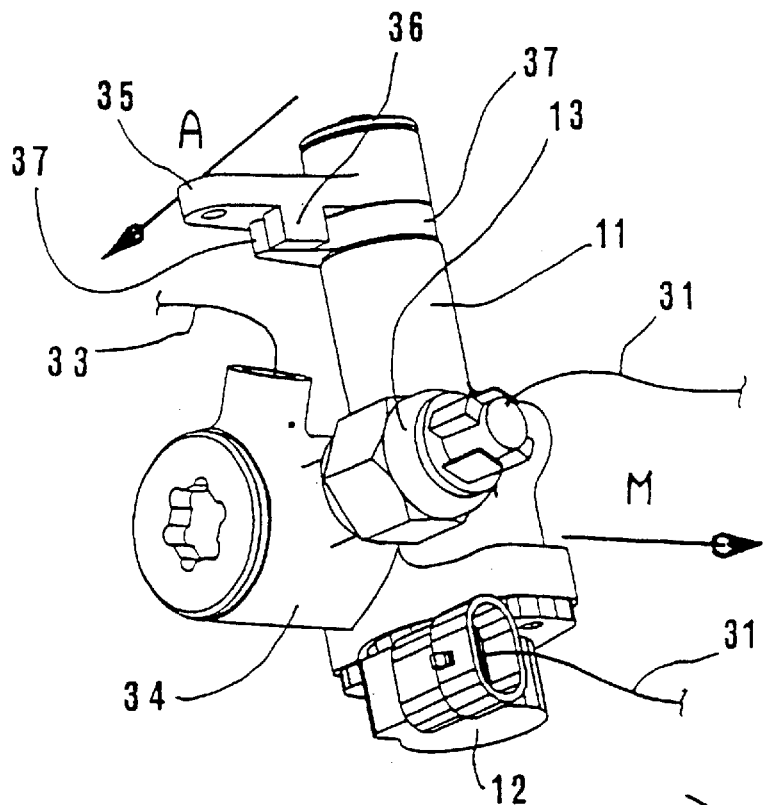
FIG. 2 is the view of the control of a motorcycle clutch.

The following are also indicated: 33, FIG. 2, is the hydraulic pipe connecting the aforementioned proportional solenoid valve 10 to the actuator 11, comprising the cylinder 34, the piston of which acts on the clutch rod by means of actuation M; 35 is the mechanical clutch lever, which is actuated by actuation A of the familiar tie rod system, which comprises an appendix 36 that makes the coupling mono-directional with a coaxial and rotating arm 37, which is connected to the aforementioned piston and to the aforementioned clutch rod.

Figure 3:
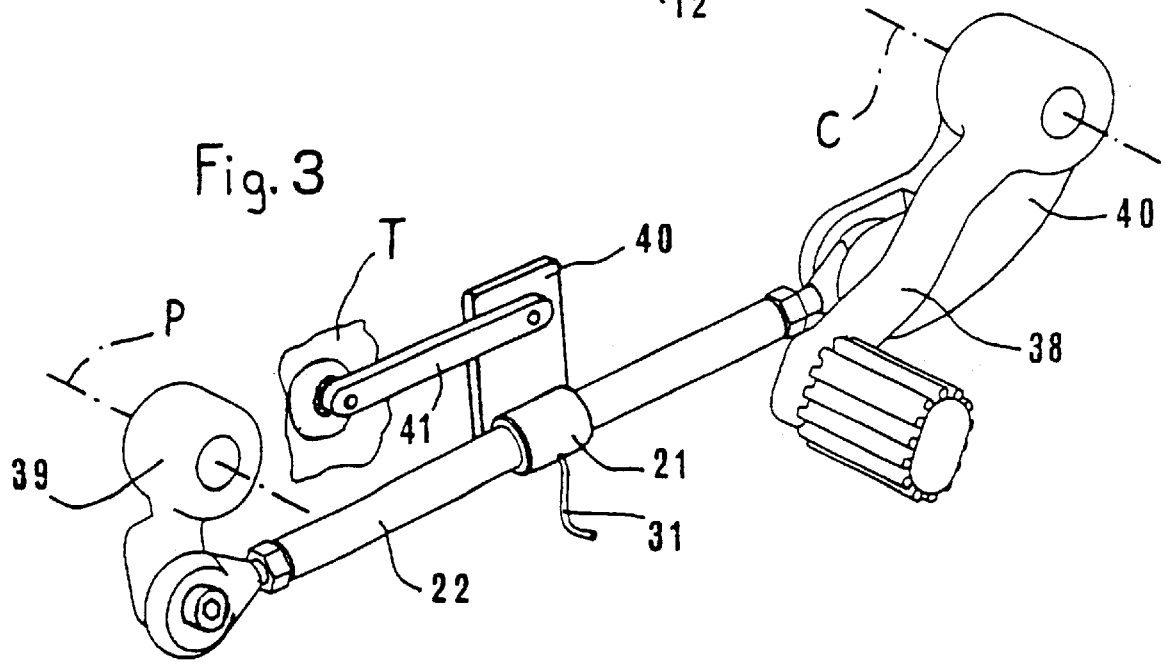
FIG. 3 is the view of the sensor on the servo-assisted gear lever of the clutch actuator.

Finally, the following are indicated: 38, FIG. 3, is the pedal that actuates a sequential motorcycle gearbox with C or P control axis by means of lever 39; rod 22 connects the two levers and supports the aforementioned sensor 21 that refers to the frame T to which it is connected by a bracket 40 and an articulated joint 41, which is fixed to the frame.

The operation of the servo-mechanism for the control of the clutch and the sequential gearbox in the illustrated case of the control of a sequential motorcycle gearbox is as follows.

The user first sets the level of intervention on the servo-assistance level selector 15, which in its most simple form can be a switch with two or more positions, or a potentiometer: it sends to the control unit 14 an analog signal, which is processed inside the control unit and is conditioned by the other parameters that will be referred to below, it is then sent to the solenoid valve 10, where the pressure response is proportional to the signal received, to actuate actuator 11 on the clutch. When the engine has been started up or has been previously switched off the user can therefore actuate the clutch lever, the microswitch 16 monitors this actuation and sends the signal to the control unit, which, on the basis of the level of intervention, regulates the analog signal for the aforementioned solenoid valve 10: the pressurised oil, from the hydraulic circuit is modulated by the aforementioned solenoid valve, circuit pressure is not monitored because it may be at maximum pressure, pressure modulated with the engine running, or the pressure is set by the pneumatic hydraulic accumulator 7, when the engine is switched off. In each case the pressure that acts directly on the cylinder 34 of the actuator 11 is directly proportional to the intervention level required by the user. Thus, if the level is not 100% but is lower it will always be the user's responsibility to supply the extra missing power by using mechanical actuation A to completely overcome the clutch-opening reaction; on the other hand the servo-assistance intervention is immediate, if the level is set at 100%, no mechanical actuation is necessary, on the contrary the reciprocal thrust between the lever 35 and the appendix 36 and the arm 37 does not occur because only the arm rotates and all the mechanical transmission to the clutch lever of the familiar type remains stationary. The proportional solenoid valve 10, if there is no electronic control unit 14, can be controlled directly by the aforementioned microswitch 16 that is in sequence with the aforementioned selector 15, in order to transmit to the solenoid valve an analog signal that is proportional to the level of intervention set by the user.

In the most complete embodiment of the servo-assisted control of the clutch, with the electronic control unit 14, other parameters can be considered that make the aforementioned servo-assistance more automatic and also make driving or riding the vehicle on which this system is applied much safer.

In fact, the microswitch on the brake lever informs the control unit 14 of the braking in progress, set by the user, and in view of the fact that in the case of powerful motorbikes, especially, braking risks jamming the rear wheel because of excessive engine braking, the control unit assesses the effective speed of the vehicle, monitored by the sensor 29, the number of engine revolutions per minute, the throttle position and gear engaged, which is monitored by the sensor 18 on the gearbox drum, and sends a modulated analog signal to the aforementioned solenoid valve 10 to obtain the partial slip of the clutch and prevent the aforementioned jamming of the rear wheel, without the intervention of the user; this intervention is modulated according to parameters obtaining at the moment in question, as it must be stronger for low gears.

In the second for of application the servo-mechanism also comprises the gearbox 21 control sensor that monitors the gear-change intention of the rod 22 of the pedal 38 of the gearbox and its direction, if any. The aforementioned sensor must always be positioned and fixed between the frame T, 40 and 41, and the gear lever, to monitor gear-lever actuation.

Aforementioned sensor 21 can also be used without the electronic control unit 14, because sensor 21 is a sequential microswitch both for changing up to higher and down to lower gears that controls the proportional solenoid switch 10: in this case the selector 15 is overridden, because the actuation of the gear lever 38 is a clear indication of the user's wish to carry out the complete cycle, the intervention of the clutch actuator 11 will therefore be 100% automatic, the action of the clutch will depend on the existence of the control on rod 22.

Using the control unit 14 with the aforementioned sensor 21 provides more functions: the automatic gear-changing cycle can occur with the most appropriate modulation of the parameters that the control unit constantly monitors, thus the duration of the gear change, requested by the user by pressing pedal 38, depends on the requirements set by the particular operating situation, determined by current wheel speed values, the number of revolutions per minute of the engine, the position of the throttle, braking or absence of braking, the gear engaged and the position of the clutch rod. The combination of these parameters enables the electronic unit, with suitable management software, to regulate the time that the actuator 11 takes to intervene on the clutch and to reduce or not reduce engine power through actuating the cut-off on the throttle or on some other instruments for temporarily reducing the power generated by the engine. The level of automatic operation that can be obtained can include starting up the vehicle from stationary, which can be made completely automatic, i.e. the clutch can be engaged without any intervention on the user's part: the user must only regulate the level of power required by adjusting the gas control and engaging the gear.

The main advantage is obtained by simultaneously using the actuator for controlling the sequential gearbox, already described in the patent application referred to above, and the actuator for the control of the clutch, together or not with the electronic control unit, which depends only on the level of automation required in the intervention; this does not prevent them from being used separately, with manual commands or also in combination with other prior-art actuators.

The simultaneous use of the actuator for the gearbox, already described in the previously mentioned patent application, enables the clutch servo-mechanism to be embodied as a completely automatic drive command, and also enables the start-up phase to be controlled, and finally, by speeding up the gear change, it can also be used for gearboxes that transmit high levels of power.

This invention applies specifically to motorcycles, but the automatic control of the sequential gearbox can also be equally applied to automobiles or to other vehicles such as go-karts.

Finally, a particular advantage for the user is the possibility of being able to fit on his or her own the sequential gearbox control for changing the motorised vehicle control from manual to servo-assisted by means of sets of parts that differ from vehicle to vehicle, but which always include the clutch and/or gearbox control parts and the instructions for fitting the complete electrical and hydraulic system for that vehicle.

In the actual embodiment, the materials, dimensions and parts may be different from those indicated, but be technically equivalent, without for that reason going beyond the legal scope of this invention. Thus, the hydraulic circuit may be embodied separately, although this is less economical and will certainly be more complex and costly.

What is claimed is:

1. An automatic servo-mechanism for sequential gearbox and clutch, operated by a mechanical lever and adapted for use in a motorized vehicle driven by an engine, the servo-mechanism including a sequential gearbox, a hydraulic circuit (1) having a pump (3) and an actuator (11) that controls the clutch and is actuated by a solenoid valve (10), the automatic servo-mechanism comprising: a selector (15) for regulating an analog electric signal that controls the solenoid valve (10); a microswitch (16) located on the mechanical lever that actuates the clutch; the hydraulic circuit also containing at least one check valve (6) disposed downstream of the pump (3); at least one pneumatic-hydraulic accumulator (7), connected downstream of the solenoid valve (10) and being proportional, in order to regulate the pressure in a controlled section (33) connected to the aforementioned actuator (11) according to the analog electric signal received.

2. The automatic servo-mechanism according to the claim 1, comprising the selector (15) that regulates the analog electric signal, being settable at any point on a scale from zero to a maximum value.

3. The automatic servo-mechanism according to claim 2, comprising an electronical control unit (14), having input signals (31) which are at least connected to the selector (15), the output signals (32) of which at least are connected to the solenoid valve (10) with an outlet pressure that is proportional to the analog electric signal.

4. The automatic servo-mechanism according to claim 3, comprising a gear sensor that is mechanically coupled to a selector drum (19) of the sequential gearbox and is connected by means of its own output signal (31) to the inputs of the control unit (14).

5. The automatic servo-mechanism according to claim 3, comprising a sensor (12) disposed at a clutch rod attached to the clutch which sensor is mechanically coupled to the actuator (11) of the clutch and is connected by means of its own output signal (31) to inputs of the control unit (14).

6. The automatic servo-mechanism according to claim 3, comprising a vehicle-speed sensor (29), which is mechanically coupled to a drive (30) for wheels of the motorized vehicle by means of its own output signal (31) to inputs of the control unit (14).

7. The automatic servo-mechanism according to claim 3, comprising a sensor of pressure (13) inside the hydraulic circuit, another sensor monitoring the position of the power control and a sensor of the engine's revolutions per minute; each one of the aforementioned sensors being connected by means of their own output signals (31) to inputs of the aforementioned control unit (14).

8. The automatic servo-mechanism according to claim 3, comprising the electronic control unit (14), having an output (32) connected to control a cut-off device that temporarily cuts off power generated by the engine.

9. The automatic servo-mechanism according to claim 1, comprising a sensor of intended gear changes (21), which sensor (21) is connected between a gear lever (38) and the frame (T) in order to monitor the intended a gear change.

10. The automatic servo-mechanism according to claim 9, comprising the sensor of intended gear change (21) being disposed between the gear lever and the frame, which sensor (21) also monitors whether a higher or lower gear has been engaged.

11. The automatic servo-mechanism according to claim 3 comprising an actuator for the sequential gearbox that actuates a gear lever (38 or 39), to actuate the gearbox without any intervention on a user's part.

12. The automatic servo-mechanism according to claim 1, configured as a kit for modifying the control of a sequential gearbox by fitting the servo-mechanism of the actuator of the clutch and of the gearbox onto a motorized vehicle, for updating the hydraulic system (1) and the hydraulic actuator

(11) that controls the clutch, the kit and controlling the gearbox and including a sensor for detecting intended gear change (21), which sensor is connected between a gear lever (38) and a frame (T) in order to monitor the intended the gear change.

13. The automatic servo-mechanism according to claim 1, configured as a kit for modifying the control of a sequential gearbox by fitting the servo-mechanism for the actuator of the clutch and for the gearbox onto a motorized vehicle, and for connecting the electronic control unit (14) and to update the hydraulic system (1) and the hydraulic actuator (11) that controls the clutch, and controls the gearbox that includes a sensor of an intended gear change (21), which sensor (21) is connected between a gear lever (38) and a frame (T) in order to monitor the intended the gear change.

* * * * *